June 12, 1951     C. V. REDINGER     2,556,634
FISH LURE
Filed Sept. 8, 1947
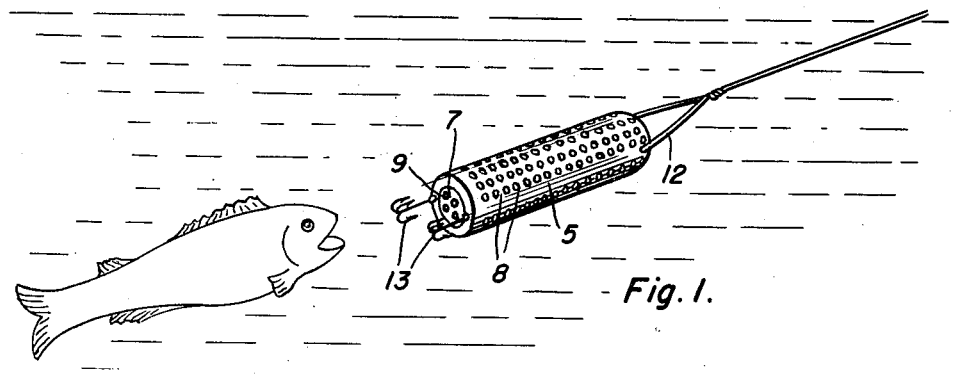
Fig. 1.
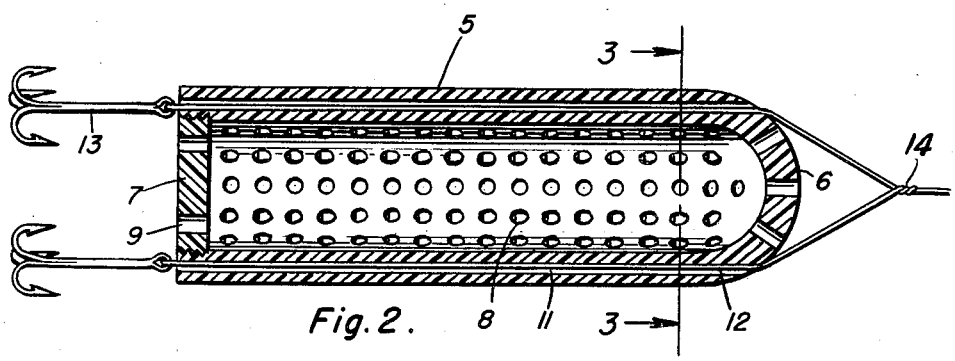
Fig. 2.
Fig. 4.
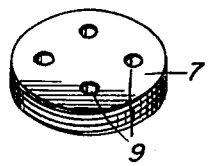
Fig. 3.
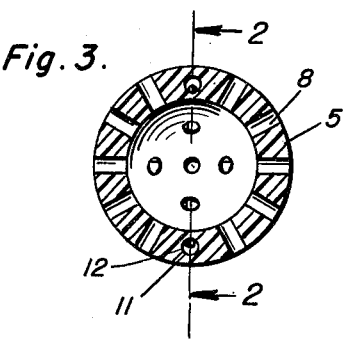
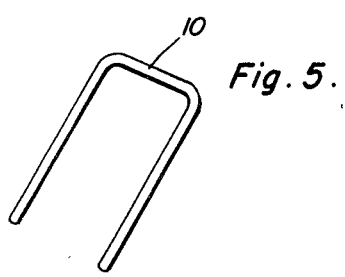
Fig. 5.
Inventor
Clarence V. Redinger
By Clarence A. O'Brien
and Harvey B. Jacobson
Attorneys Patented June 12, 1951

2,556,634

UNITED STATES PATENT OFFICE 2,556,634

FISH LURE

Clarence V. Redinger, San Bernardino, Calif.

Application September 8, 1947, Serial No. 772,700

1 Claim. (Cl. 43—41)

The present invention relates to new and useful improvements in fish lures and more particularly to a hollow perforated body in which raw meat or other bait may be carried to attract the fish.

An important object of the present invention is to provide novel means for attaching the lure to a fish line and wherein the fish hooks also attached to the line are maintained in a separated position without danger of entanglement.

A further object is to provide a device of this character of simple and practical construction, which is efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view;

Figure 2 is an enlarged longitudinal sectional view;

Figure 3 is a transverse sectional view taken on a line 3—3 of Figure 2;

Figure 4 is a perspective view of the removable plug for the rear end of the body; and Figure 5 is a perspective view of the manipulating tool or wrench for the plug.

Referring now to the drawing in detail, wherein, for the purpose of illustration, I have disclosed a preferred embodiment of the invention, the numeral 5 designates a hollow, substantially cylindrical body preferably constructed of transparent material and having a rounded front end 6 and an open rear end in which a plug 7 is threadedly fitted. The body 5 is provided with perforations 8 in its front and side portions and the plug 7 is also provided with openings or perforations 9. The openings 9 are adapted to receive a tool 10 of a spanner wrench type to facilitate threading of the plug into the rear end of the body and for removing the plug therefrom.

A pair of bores 11 extend longitudinally through the walls of the body 5 from the front to the rear end thereof and through which fish lines or leaders 12 extend, the fish lines being connected to each other at the front end of the body at 14 and have fish hooks 13 attached to the rear ends of the lines for securing the hooks closely against the rear end of the body 5.

In the use of the invention, the body 5 may contain raw meat or other suitable bait and which, when drawn through the water, will attract fish. The bait is protected from consumption by the fish and may be easily replaced with fresh bait by removing the plug 7.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claim.

Having described the invention, what is claimed as new is:

A fish lure comprising a one-piece elongated hollow body open at its rear end and composed of a cylindrical wall portion and a convex segmento-spherical front end wall portion of uniform thickness and provided with numerous perforations, the cylindrical wall portion having straight parallel and diametrically opposed longitudinal bores entirely through the same, leaders extending through said bores and connected together in front of the body, fish hooks behind the body attached to the rear ends of said leaders, and a removable flat perforated closure disk in the rear end of the body.

CLARENCE V. REDINGER.

REFERENCES CITED

The following references are of record in the file of this patent:

UNITED STATES PATENTS

| Number | Name | Date |
|--------|------|------|
| 489,110 | Welch | Jan. 18, 1893 |
| 753,572 | Dales | Dec. 22, 1896 |
| 1,101,655 | Ness | June 30, 1914 |
| 1,673,978 | Guindon | June 19, 1928 |
| 2,081,671 | Lauer | May 25, 1937 |
| 2,237,534 | Van der Clute | Apr. 8, 1941 |
| 2,303,753 | Merle | Dec. 1, 1942 |